Aug. 19, 1930.　　　J. H. CAPLAN　　　1,773,422
FASTENER AND METHOD OF ASSEMBLING THE SAME
Filed Aug. 11, 1926
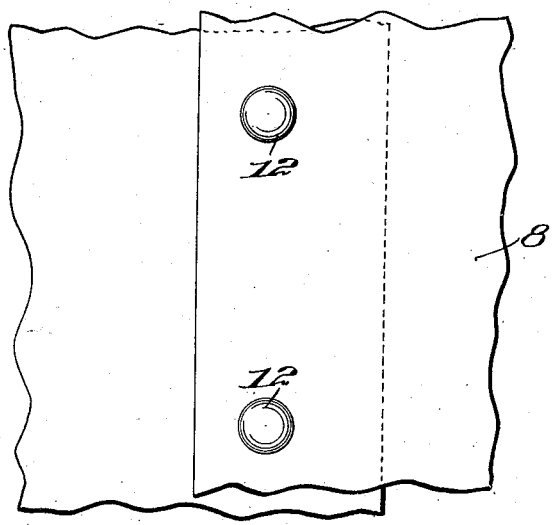
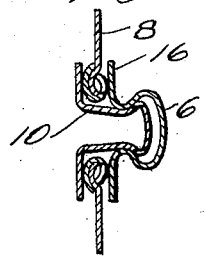
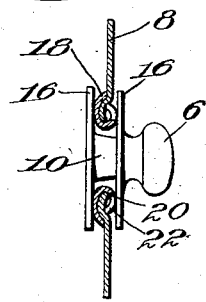
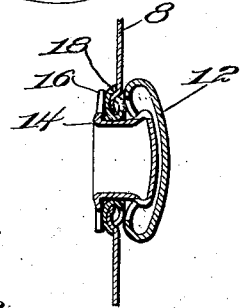
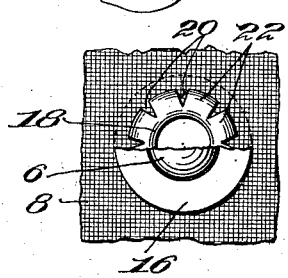

Patented Aug. 19, 1930

1,773,422

UNITED STATES PATENT OFFICE

JAMES H. CAPLAN, OF BOSTON, MASSACHUSETTS

FASTENER AND METHOD OF ASSEMBLING THE SAME

Application filed August 11, 1926. Serial No. 128,557.

The present invention relates to fasteners and methods of assembling the same and is more particularly concerned with snap fasteners employing cooperating socket and button members adapted to engage resiliently with each other.

The common type of snap fastener used in connection with fabrics and other flexible materials comprises cooperationg socket and button members, the latter being adapted to be resiliently received within the former. To facilitate attachment to the fabric, each member is composed of two parts, a cap and a base, the cap being exposed on the upper surface of the fabric and the base extending through the fabric for inseparable attachment to the cap. In order to provide for attachment to the fabric each part is formed with an annular extended flange, the two flanges appearing on opposite sides of the fabric and being adapted to grip the fabric between them. The construction is such that the two parts of each member are firmly secured together by pressure after the cap is mounted on the base, thereafter preventing separation without mutilating the fastener. This resilient connection between the cap and base is ordinarily relied upon to afford the pressure for holding the cloth securely between flanges. However, this pressure is not sufficient, especially when the fabric is of thin material, to hold the fabric securely against tearing or pulling out from the fastener member under ordinary lateral stresses. This is especially true after the fastener has been in use for some time because of the fact that the continued pulling on the socket and button members tends to cause loosening of the connection between the two parts of each member which, while not impairing the fastener itself results in a reduction of its usefulness because of the decreased gripping effect on the fabric by the separation of the flanges.

The object of the present invention is to device a fastener and a method of assembling the same whereby each fastener member will be securely assembled in proper position with relation to the fabric and the fabric will be protected against pulling out or breaking away from the fastener even under long continued use.

With this object in view, the principal feature of the invention contemplates the provision of a two-part fastener member in combination with a rigid fabric gripping and reinforcing member having provision for a firm extended annular engagement with opposite sides of the fabric independent of the assembly of the two-part fastener member. The gripping device has annularly extended flanges which engage on opposite sides of the fabric and is provided with a central opening through which the base of the fastener member may extend for inseparable connection with the cap portion. The gripping device determines the size of the opening in which the fastener is mounted and by its tenacious engagement with the cloth insures against the transmission of any stresses from the fabric to the fastener member. The flanges on the base and cap of the fastener member are thus required only to position the fastener with relation to the fabric and are not called upon to form a secure means of attachment to the fabric itself. In the simplest and most efficient form of the invention yet devised, the gripping device comprises a tubular member adapted to be pressed to form annular flanges tenaciously gripping opposite sides of the fabric and is similar to the usual metallic eyelet.

Other features of the invention consist in certain novel features of construction and modes of assembling the same as hereinafter described and particularly defined in the claim.

In the accompanying drawings Fig. 1 is a view of two pieces of fabric connected together by means of the snap fastener of the present invention; Fig. 2 is a side elevation, partly in section, of the button member of the snap fastener; Fig. 3 is a sectional view of the socket member of the snap fastener assembly; Fig. 4 is a front elevation, partly in section, of the fastener member shown in Fig. 2; and Fig. 5 is a sectional view of the button member of the fastener.

The illustrated embodiment of the invention shown in Fig. 2 and 3 comprises a complete fastener consisting of a button member and a socket member adapted for attachment to separate pieces of fabric and arranged so that the button member may be resiliently received within the socket. The button member, as shown in Figs. 2 and 5, comprises a cap portion 6 which is adapted to lie above the top surface of the fabric 8 together with a base portion 10 extended through an opening in the fabric and inseparably secured to the cap 6. The socket member, as shown in Fig. 3 is of a similar construction comprising a cap 12 and a base 14 and as is usual with devices of this nature both the cap and base are formed with serrated portions which upon assembly through an opening in the fabric may be pressed together in a manner to prevent subsequent separation thereof. The cap and base portions of each member are provided with annular flanges 16 which are ordinarily employed to engage with the surface of the fabric upon assembly of either of the members of the fastener. By the present invention there is provided between the flanges of each of the fastener members a cloth gripping and reinforcing device 18 which is arranged for extended annular engagement with both sides of the fabric prior to the insertion of the fastener. This gripping device is of initial tubular form, similar to an eyelet, and when assembled on the fabric has annular fabric engaging portions which are pressed toward each other from opposite sides in such a manner as to impress the edges thereof firmly into the fabric, as shown in Figs. 2 and 3. For this purpose, the under face of the device is smooth and the upper surface is notched, as indicated at 20, to form a plurality of teeth 22 which are impressed firmly into the fabric to form a tenacious engagement between the fabric and the gripping member. The central opening inclosed by the annular flanged portions of the gripping device determines the opening within which the fastener member is mounted, and, therefore, accurately determines the position of the fastener with relation to the fabric.

In assembling a fastener member, the gripping device 18 is first pressed into the fabric after the manner of attaching an eyelet to a piece of material. After attachment of the gripping device the base portion of the fastener member is passed through the central opening and the cap portion is struck down upon the base to secure the two parts of the fastener member together. This attachment of the fastener member, it will be seen, is entirely independent of its attachment to the fabric, only sufficient pressure being required to permit resilient and inseparable engagement of the two portions of the fastener member. The engagement of the gripping device with the fabric occurs over a sufficient area so that lateral stresses will not tend to loosen the fabric from the fastener. Moreover, the usual flexing of the fabric which necessarily accompanies connection or disconnection of the button and socket members can not result in pulling of the cloth away from the fastener or loosening of the attachment of the two parts of either of the fastener members.

The term fabric as used in the specification and pending claims is not limited to a textile fabric but may include any flexible material such as leather.

What is claimed is:

The combination with a fabric of a rigid fabric gripping and reinforcing member having extended flanges on opposite sides of the fabric and penetrating and engaging firmly with the fabric, and a fastener member having a base portion and a cap portion inseparably secured together, said portions being provided with flanges for engaging and clamping the gripping member on opposite sides, the two parts of the fastener member being adapted to be assembled by direct axial movement independently of the mounting of the gripping member with relation to the fabric.

In witness whereof I have signed my name to this specification.

JAMES H. CAPLAN.